United States Patent

[11] 3,578,352

| | | |
|---|---|---|
| [72] | Inventor | Franz Heine<br>Essen, Germany |
| [21] | Appl. No. | 799,247 |
| [22] | Filed | Feb. 14, 1969 |
| [45] | Patented | May 11, 1971 |
| [73] | Assignee | Fried, Krupp Gesellschaft mit beschrankter Haftung<br>Essen, Germany |
| [32] | Priority | Feb. 16, 1968 |
| [33] | | Germany |
| [31] | | P 16 80 141.5 |

[54] VEHICLE WITH FRAME ADAPTED TO BE RAISED AND LOWERED
7 Claims, 7 Drawing Figs.

[52] U.S. Cl. .................................................. 280/43.23
[51] Int. Cl. .................................................. B62d 21/18
[50] Field of Search ........................................ 280/43,
43.17, 43.23; 180/9.2, 41

[56] References Cited
UNITED STATES PATENTS

| 3,063,510 | 11/1962 | Hunger et al. | 180/9.2 |
| 3,342,506 | 9/1967 | Whitfield et al. | 280/34.23 |
| 3,371,940 | 3/1968 | Sinclair et al. | 180/9.2 |

*Primary Examiner*—Benjamin Hersh
*Assistant Examiner*—Robert R. Song
*Attorney*—Walter Becker ABSTRACT: A vehicle with a plurality of axles or axle groups supported by angle levers in which said angle levers are adapted to be interconnected by coupling rod means which have associated therewith hydraulically operably cylinder piston means operable to act upon said angle lever means so as selectively to raise and lower the vehicle body relative to the wheels supported by the axles or axle groups.

Patented May 11, 1971

Inventor:
Franz Heine
By
Walter Becker

VEHICLE WITH FRAME ADAPTED TO BE RAISED AND LOWERED

The present invention relates to the problem of lifting the frame of a vehicle having a loading surface, or for instance a crane superstructure, selectively out of its normal position in order to increase the ground clearance for cross-country driving, or to lower the vehicle frame in order to reduce the height of the vehicle when driving through an underpass, or in order to have to lift the goods to be loaded onto the vehicle as little as possible. In this connection it is frequently necessary that in conformity with certain conditions of operation, the vehicle frame may be rested directly on the ground, independently of the vehicle wheels at least as far as the main load acts thereupon, in which instance the wheels are lifted off the ground.

Adjusting devices for adjusting the height of vehicle frame are known according to which advantage is taken of the property of gas or gas-liquid spring means in which instance gas or liquid is withdrawn or introduced whenever an adjustment as to height is to be effected. However, in many instances the application of gas and gas-liquid spring means cannot be realized. It is also possible to lift the frame of a vehicle relative to the vehicle axles by means of mechanical or hydraulic hoisting means after the connection between the vehicle frame and the axles has been disengaged, for instance, at the connecting links of the vehicle springs. Such an operation, however, requires considerable time.

It is, therefore, an object of the present invention to solve the above mentioned problem in a particularly simple and therefore economic manner.

This object and other objects and advantages of the invention will appear more clearly from the following specification in connection with the accompanying drawings, in which:

FIG. 1 diagrammatically illustrates a side view of a motor vehicle according to the present invention.

FIG. 2 represents a side view of a modified motor vehicle according to the present invention which differs from the vehicle of FIG. 1 in that it has four axles instead of two axles.

FIG. 3 diagrammatically illustrates a side view of still another modified motor vehicle according to the invention which differs from that of FIG. 2 primarily with regard to the cylinder piston systems employed therein.

The invention is based on a vehicle with two axles or axle groups which are journaled on oscillating arms and may be interconnected by a linkage system in the manner of a balancing lever, to which end two telescopically interengaged hydraulically operable parts of a coupling rod of the linkage system are interlocked.

With the above in mind, the present invention consists primarily in that the two coupling rod parts for lifting and lowering the vehicle frame with regard to the vehicle wheels resting on the ground and for lifting and lowering the wheels relative to the vehicle frame resting on the ground are adjustable in longitudinal direction by at least one hydraulic power operable device through the intervention of a valve.

This may be realized, for instance, in such a manner that a hydraulic power operable device, the cylinder of which is connected to a coupling rod part while the piston rod is connected to another coupling rod part, serves for adjusting the coupling rod parts relative to each other and also for locking said coupling rod parts to each other to which end by means of the said valve a bypass line between the two ends of the cylinder is interrupted.

It is also possible to connect two hydraulic power operable devices which respectively engage the coupling rod parts to the said valve while the two coupling rod parts may be mechanically interlocked in at least three positions.

Figure 1:
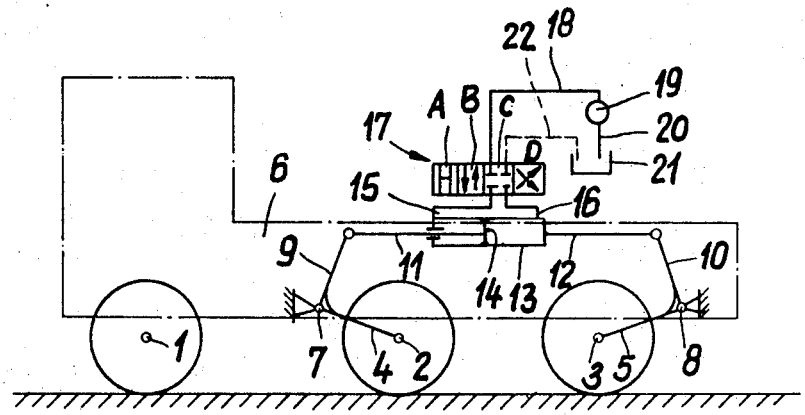

Referring now to the drawings in detail and FIG. 1 thereof in particular, the vehicle shown therein is provided with a steering axle 1 located below the driver's cab and with two additional axles 2 and 3. Each of these axles is on both sides of the vehicle journaled at the ends of two oscillating arms 4 and 5 respectively which form the legs of an angle lever. The angle lever is journaled on the vehicle frame 6 in a joint 7, 8 respectively with the axle extending transverse to the driving direction. The journaling of these axles is such that the oscillating arms 4, 5 when in position for street driving extend from the joints 7, 8 toward each other with a slight downward inclination. The other legs 9, 10 of the angle levers extend in the illustrated position for street driving from the joints 7, 8 steeply upwardly. At their upper ends, two members 11 and 12 respectively pertaining to a coupling rod are pivotally connected to the legs 9 and 10 respectively. To the member 12 there is connected a double-acting cylinder pertaining to a hydraulic power device, the piston 14 of which is connected to the piston rod formed by the part 11 of the coupling rod.

The two ends of the cylinder 13 have connected thereto conduits 15, 16 which lead to a four-way valve 17. Valve 17 furthermore comprises a connection to a pressure line 18 leading to the pressure side of a pump 19 the suction side of which communicates through a conduit 20 with a reservoir 21 into which leads a conduit 22 likewise connected to the valve 17. The valve 17 has four control positions A, B, C, D.

In control position C, the two conduits 15 and 16 are blocked. Consequently, no liquid can pass from the cylinder chamber on one side of the piston 14 to the other cylinder chamber. Since the liquid is practically not compressible, the parts 11 and 12 will in this way be locked to each other so that a rigid coupling rod 11, 12 is formed. In this way a linkage 3, 4, 9, 10, 11 and 12 is obtained by means of which the axles 2 and 3 are interconnected in the manner of a balancing lever. This means that, when the axle 2 swings upwardly, the axle 3 will automatically and to the same extent move downwardly and vice versa. Thus, a load compensation or equalization is obtained between the two axles. The adjustment is provided for ordinary driving of the vehicle.

When the vehicle frame 6 is to be lifted, the four-way valve 17 is moved to its control position B. In this position, the pump 19 will through the conduits 18 and 15 convey pressure fluid into one chamber of the cylinder 13, whereas simultaneously liquid from the other cylinder chamber will escape through conduits 16 and 22 into the reservoir 21. Consequently, the piston 14 will in cylinder 13 move toward the right, and the angle lever 4, 9 will turn in the joint 7 in clockwise direction, whereas the angle lever 5, 10 will in joint 8 turn in the opposite direction. As a result thereof, the vehicle frame will be lifted with regard to the wheels carried by the axles 2, 3 and resting on the ground. When during this operation the vehicle frame 6 has reached a certain height, the four-way valve 17 is moved to its control position C so that the coupling rod portions 11 and 12 will again be locked to each other and the obtained height of the vehicle frame 6 will be secured.

For lowering the vehicle frame with regard to the wheels pertaining to the axles 2 and 3 and resting on the ground, the valve 17 is moved to its control position A. Inasmuch as in this instance both parts of the cylinder 13 communicate with each other, the liquid which is located in that portion of the cylinder 13 which is left of the piston 14 will be able through conduits 15 and 16 to flow to the other cylinder portion without encountering any difficulties. Inasmuch as consequently the piston 14 is able to move freely within the cylinder 13, it will not oppose a lowering of the vehicle frame 6 which lowering will be accompanied by a tilting of the angle lever 4, 9 in counterclockwise direction and a tilting of the angle lever 5, 10 in clockwise direction, in other words, by a pulling away from each other of the coupling rod portions 11, 12. When a desired low position of the vehicle frame has been reached, a further lowering of the vehicle frame will be prevented by moving the valve 17 again to its control position C.

If the vehicle frame 6 is supported by the ground independently of the wheels of the axles 2 and 3, for instance by an automobile crane by means of pivotable supports and supporting spindles associated therewith, the vehicle wheels on the axles 2 and 3 may be lifted by moving the valve 17 to its control position D. It will be appreciated that in this position, the pump 19 will press liquid through conduits 18 and 16 into that chamber of cylinder 13 which is located on the right-hand side of the piston 14 whereas simultaneously liquid can escape from the other cylinder chamber through the conduits 15 and 22 into the reservoir 21.

If later the wheels on the axles 2 and 3 are again to be lowered to the ground and it is intended to lift the vehicle frame 6 relative to the wheels to such an extent that it rests only on the wheels and no longer on the ground supports, the valve 17 is moved to its control position B.

Figure 2:
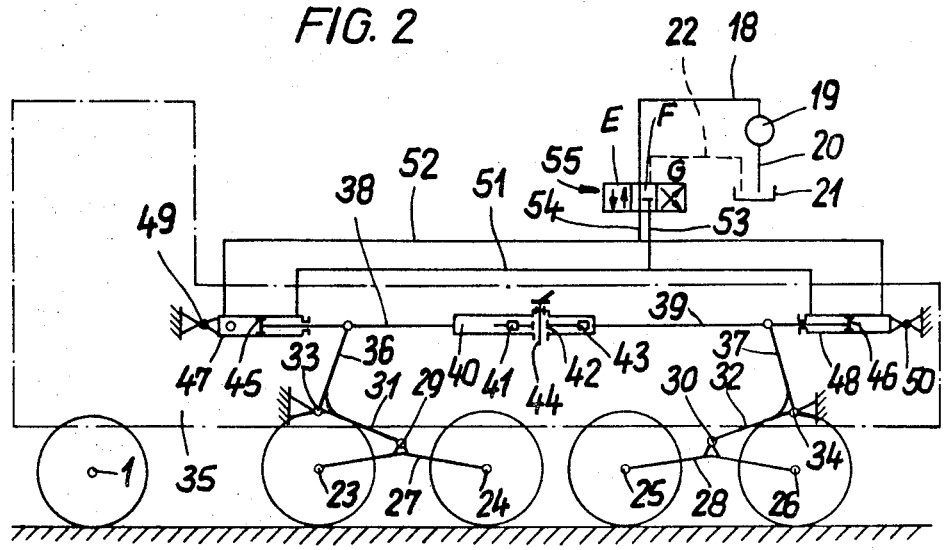

According to the embodiment of the invention as shown in FIG. 2, the vehicle in addition to the steering axle 1 has four axles 23, 24, 25, 26. Each two of these four axles are on each vehicle side interconnected by oscillating arms 27, 28 which are journaled in joints 29, 30 at the ends of the arms 31, 32 of angle levers which in the same manner as the angle levers 4, 9; 5, 10 of FIG. 1 are journaled in joints 33, 34 on the vehicle frame 35. The upwardly extending legs 36, 37 of the angle levers are pivotally connected to two parts 38, 39 of a coupling rod.

The coupling rod parts 38, 39 have those ends thereof which face each other in telescopic engagement with each other. This is effected by means of a sleeve 40 on part 38 and by means of that end of the coupling rod 38 which slides in sleeve 40. This end has three bores 41, 42, 43. The coupling rod parts 38, 39 are adapted in three different positions firmly to be interconnected by a transverse lock 44 which is adapted to be inserted through bores in sleeve 40 and through the respective bore 41, 42, 43.

At those ends of the coupling rod parts 38, 39 which face away from each other there are provided pistons 45, 46 reciprocably mounted in double-acting cylinders 47, 48 which are by means of joints 49, 50 connected to the vehicle frame 35, while being pivotable in clockwise and counterclockwise direction.

Those ends of the cylinders 47, 48 which face each other communicate with each other through a conduit 51 whereas those ends of the cylinders 47, 48 which face away from each other communicate with each other through a conduit 52. These two conduits are independently of each other connected to a three-way valve 55 through conduits 53, 54 respectively. Connected to said valve 55, similar to the embodiment of FIG. 1, is a pump 19 through a pressure line 18. The suction line 20 of pump 19 leads to a reservoir 21 into which also leads a conduit 22 communicating with said valve 55. Valve 55 has four control positions E, F, G and H. When driving the vehicle with the normal height of the vehicle frame 35, the coupling rod parts 38 and 39 are locked in their intermediate position by a transverse locking member 44 extending through the bore 42. In this position, the three-way valve 55 occupies its control position F.

Inasmuch as consequently the angle levers 31, 36 and 32, 37 are interconnected by a rigid coupling rod 38, 39, the axle pairs 23, 24 and 25, 26 will oscillate as if they were interconnected by a balancing lever while by means of the oscillating arms 27 and 28 a load equalization will be brought about between the axles of each pair. All four axles 23, 24, 25, 26 thus will be subjected to the same axle pressure. The oscillating back and forth of the coupling rod 38, 39 is not interfered with by the pistons 45 and 46 inasmuch as the conduits 51 and 52 will bring about a liquid equalization between the respective parts of the cylinders 47 and 48. By selection of the cross sections in the conduits 51 and 52, there is attained a damping of the oscillating systems 27 and 28.

When the vehicle frame 35 is to be lifted with regard to the wheels which pertain to the axles 23, 24, 25, 26 and which rest on the ground, the three-way valve 55 is moved to its control position E. In this position, the pump 19 presses liquid through the conduits 18, 54 and 52 into those chambers of the cylinders 47, 48 which face away from each other. Similarly, liquid from the other cylinder chambers escapes through conduits 51, 53 and 22 to the reservoir 21. This requires, however, that the transverse lock 44 is withdrawn from the bore 42 so that the coupling rod part 39 will be able to move further into said sleeve 40 of the part 38. This is associated with a tilting of the angle lever 31, 36 in clockwise direction and a tilting of the angle lever 32, 37 in counterclockwise direction whereby the vehicle frame 35 will be lifted. When during this operation the bore 43 has been adjusted so as to be in alignment with the bores of sleeve 40 which receive the transverse locking member 44, the latter is passed through bore 43 so that the coupling rod parts 38, 39 will be interlocked in the correspondingly lifted position of the vehicle frame 35.

For purposes of lowering the vehicle frame 35, the three-way valve 55 is moved to its control position G while the transverse locking member 44 is again out of engagement with the coupling rod part 39.

The pump 19 now presses liquid through conduits 18, 53 and 51 into those chambers of cylinders 47, 48 which face each other, while simultaneously liquid escapes from the other cylinder chambers through conduits 52 and 22 into the reservoir 21. If consequently the coupling rod part 39 is pulled out of the sleeve 40 to such an extent that the bore 41 is in alignment with the bores of the sleeve 40 which receive the transverse locking member 44, the latter is passed through the bore 41. As a result thereof, the coupling rod parts 38, 39 are interlocked in a position which corresponds to a position in which the vehicle frame 35 is lowered relative to its normal position. In view of the pulling apart of the coupling rod parts 38, 39, the angle lever 31, 36 has been tilted in counterclockwise direction whereas the angle lever 23, 37 has been tilted in clockwise direction.

The control position G also serves for lifting the wheels of the axles 23, 24, 25, 26 off the ground when the vehicle frame 35 is supported on the ground by other means, as for instance, by tiltable supports. The control position H is used for filling the cylinders 47 and 48.

Figure 3:
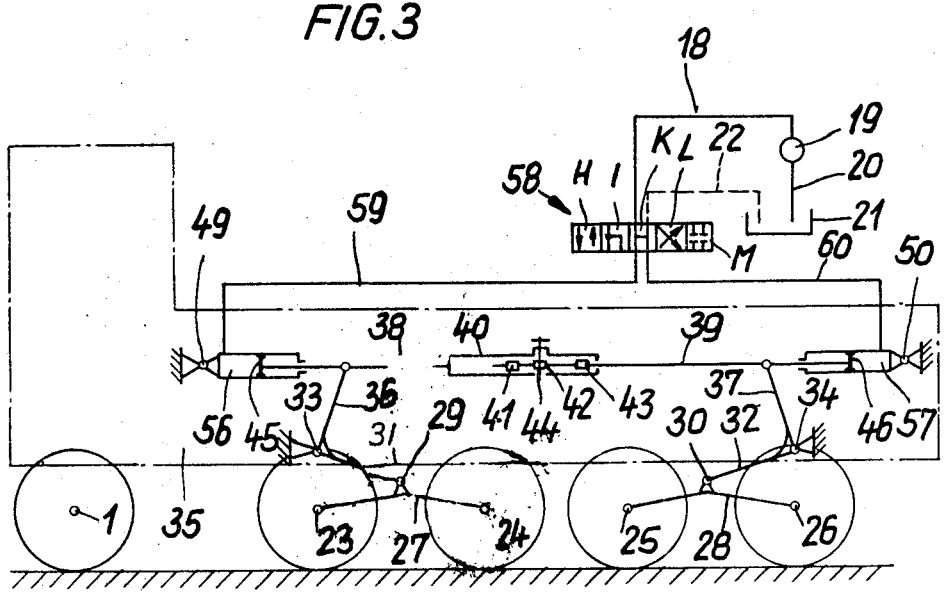

The embodiment of FIG. 3 differs from that of FIG. 2 primarily in that the cylinders 56, 57 which receive the pistons 45, 46 respectively are not double-acting but are single acting. Furthermore, the five-way valve 58 has five control positions H, I, K. L and M. Otherwise, the same reference numerals have been employed for those parts of FIG. 3 which correspond to those of FIG. 2.

Each of the two single acting cylinders 56 and 57 is by means of a separate conduit 59 and 60 respectively connected to the five-way valve 58.

FIG. 3 shows the end position for normal driving of the vehicle. In this position, the coupling rod parts 38 and 39 are held in their intermediate position with regard to each other by means of the transverse locking member 44 passed through the bore 42. The valve 58 couples its control position K. Consequently, liquid can unimpededly pass from the cylinder 56 through conduits 59, 60 to the cylinder 57, and vice versa. The coupling rod 38, 39 is thus able freely to oscillate back and forth. The axle pairs 23, 24 and 25, 26 are consequently interconnected in the manner of a balancing lever.

When the vehicle frame 35 is to be lifted with regard to the wheels which pertain to the axles 23, 24, 25, 26 and rest on the ground, the valve 58 is moved to its control position I, and the transverse locking member 44 is pulled out of the bore 42. Pump 19 will now press liquid through conduits 18, 59 and 60 into the cylinders 56, 57 so that the coupling rod parts 38, 39 will be telescoped into each other. Inasmuch as this is associated with a tilting of the angle lever 31, 36 in clockwise direction and a tilting of the angle lever 32, 37 in counterclockwise direction, the vehicle frame 35 will be lifted. When the vehicle frame 35 will be in the desired position at which the bore 43 is in alignment with the bores of sleeve 40 which receive the transverse locking member 44, the latter is passed through the bore 43 so that the coupling rod parts 38, 39 will be interlocked while the vehicle frame 35 is in its lifted position.

When it is desired again to lower the vehicle frame 35, the transverse locking member 44 is withdrawn from the bore 43, and valve 58 is moved to its control position K. In this position, due to the weight of the vehicle frame 35, the angle lever 23, 37 is turned in clockwise direction and the angle lever 31, 36 is turned in counterclockwise direction while the vehicle frame 35 moves downwardly and the coupling rod part 39 is pulled out to a corresponding extent. Liquid from the cylinders 56, 57 is discharged and through conduits 59, 60 and 22 is conveyed to the reservoir 21. Depending on whether the vehicle frame 35 is to be lowered to its normal position or to a position below its normal position, the transverse locking member 44 will with a given position of the coupling rod parts 38, 39 with regard to each other be passed through the bores 42, 41.

If the vehicle frame 35 is supported on the ground independently of the wheels of the axles 23, 24, 25, 26, for instance, by means of tilting arms, the wheels of the axles 23, 24 or the wheels of the axles 25, 26 may be lifted off the ground. In the first instance, the valve 58 is moved to its control position L while the coupling rod parts 38, 39 remain interlocked by the transverse locking member 44. The pump 19 will then press liquid through conduits 18 and 60 into the cylinder 57, whereas simultaneously liquid escapes from the cylinder 56 through the conduits 59 and 22 into the reservoir 21. Consequently, the coupling rod 38, 39 will be moved to the left while the two angle levers 31, 36 and 32, 37 will turn in clockwise direction. This is associated with a lifting of the wheels of the axles 23, 24 off the ground.

When it is desired to lift the wheels of the axles 25, 26 off the ground, valve 58 is moved to its control position H.

The embodiment shown in FIG. 3 yields the further possibility of blocking the coupling rod 38, 39 by moving the valve 58 to its control position M, so that both conduits 59, 60 are blocked independently of each other. As a result thereof, a load equalization between the axle pairs 23, 24 and 25, 26 will not be possible which condition may be desired for many conditions of operation.

The same result could be obtained with the embodiment of FIG. 2 if shutoff valves were provided in the conduits 51 and 52. If with corresponding valves inserted into the conduits 51 and 52 the flow of liquid between the cylinders 47 and 48 would be more or less throttled, a cushioning of the oscillation could be brought about.

Figure 4:
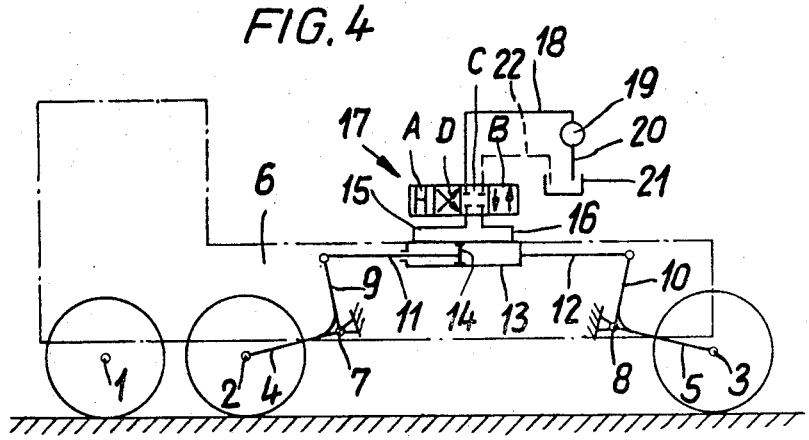
FIG. 4 represents a diagrammatic side view of still another modification of a motor vehicle according to the invention, in which the oscillating arms supporting the vehicle axles are directed away from each other.
Figure 5:
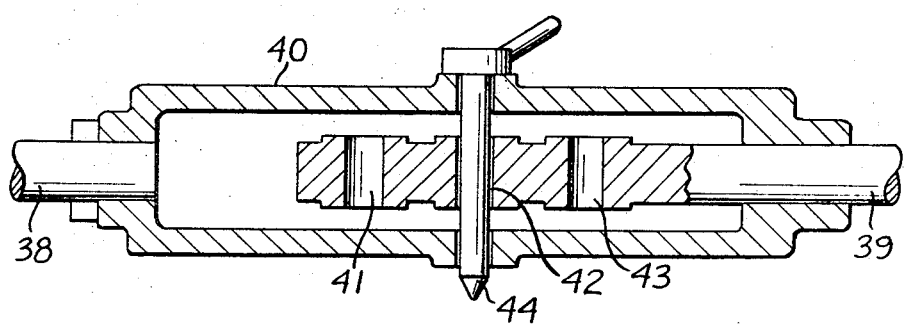
FIG. 5 shows on a larger scale than the preceding FIGS. and in greater detail the telescopic engagement of linkage sections used in connection with the present invention.
Figure 6:
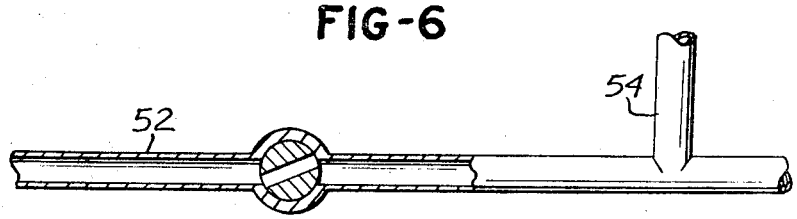
FIG. 6 and 7 illustrate throttle valves in connection with conduits leading to the cylinder piston systems of the invention.
Figure 7:
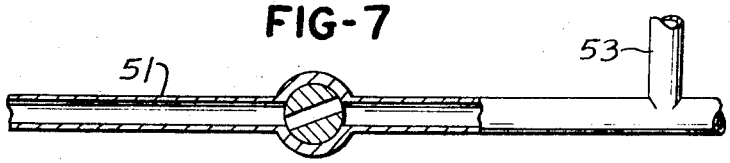

FIG. 4 shows that according to the present invention the oscillating arms carrying the vehicle axles may, instead of being directed toward each other from the joints on the vehicle frame, also be directed away from each other. This arrangement is shown in FIG. 4 for a corresponding modification of the embodiment of FIG. 1. In this instance, in the same manner as described in connection with FIG. 1, the vehicle frame 6 may be lifted with regard to the wheels on the ground or the wheels may be lifted and lowered with regard to the vehicle frame supported on the ground. In other words, merely the purpose of the control positions B and D is reversed.

It is, of course, to be understood that the present invention is, by no means, limited to the particular embodiments shown in the drawings but also comprises numerous modifications within the scope of the appended claims

I claim:

1. In combination with a vehicle having a vehicle body and at least two axles with wheels for supporting said vehicle body, which includes: a plurality of angle lever means pivotally supported by said vehicle body, coupling rod means comprising two sections one behind the other with two end portions thereof displaceably arranged one within the other, one arm of each of said angle lever means respectively pivotally supporting one of said axles and the other arm of each of said angle lever means being respectively pivotally connected to said sections, hydraulically operable means operatively connected to said coupling rod means for actuating the same to pivot said plurality of angle lever means and the wheel axles supported thereby relative to said vehicle body to thereby raise and lower the latter relative to said wheels, said hydraulically operable means comprising two hydraulically operable cylinder piston systems respectively operatively connected to those end portions of said two sections which are remote from each other, said two hydraulically operable cylinder piston systems being pivotally supported by said vehicle body, said arrangement also including valve means controlling the supply of actuating fluid to and from each of said cylinder piston systems, and locking means associated with those end portions of said sections which are displaceably arranged one within the other for interlocking said last mentioned end portions in different relative positions with regard to each other.

2. An arrangement according to claim 1, in which each of said cylinder piston systems is double-acting, and which includes separate conduit means for respectively interlocking the respective corresponding portions of said two cylinder piston systems, said valve means being connected to said separate conduit means and being able alternately to connect said separate conduit means to a source of pressure fluid and to an exhaust.

3. An arrangement according to claim 1, in which said two hydraulically operable cylinder piston systems are single acting, and which includes two independent conduits respectively connecting the fluid operable portions of said two single acting cylinder piston systems to said valve means, said valve means being operable alternately to connect one of said two conduits with a source of pressure fluid and the other conduit with an exhaust, and vice versa.

4. An arrangement according to claim 1, which includes means for selectively interrupting communication between said two hydraulically operable cylinder piston systems.

5. An arrangement according to claim 2, which includes throttle means interposed in said separate conduit means.

6. In combination with a vehicle having a vehicle body and at least two axles with wheels for supporting said vehicle body, which includes: a plurality of angle lever means pivotally supported by said vehicle body, coupling rod means comprising two sections one behind the other with two end portions thereof displaceably arranged respectively pivotally supporting one of said axles and the other arm of each of said angle lever means being respectively pivotally connected to said sections, said displaceably arranged end portions constituting hydraulically operable cylinder and piston means, multipath valves means operatively connected to said cylinder means, adjustable at random into positioning and relatively setting the hydraulically operable means, and said hydraulically operable means being displaceable under fluid pressure in opposite directions with respect to each other such that due to pivoting of said angle lever means there is lifting of the vehicle body into a raised higher lever with respect to wheels supporting the same, and means establishing stable connection of said two sections of coupling rod means.

7. A combination further in accordance with claim 6, in which said hydraulically operable means are double-acting and opposite cylinder ends respectively being part of said hydraulically operable means, conduit means interconnecting said opposite cylinder ends with said multipath valve means which in one position interconnects both opposite cylinder ends with each other and with conduit means for outlet, a fluid pressure source connected to one cylinder end by said multipath valve means in another position while the remaining cylinder end is connected thereby to conduit means for outlet, in a further position of said multipath valve means there being connection of the first mentioned cylinder end to conduit means for outlet while the second mentioned cylinder end is connected to said multipressure source, and in a still further position of said multipath valve means there is blockage of both cylinder ends so that both sections of coupling rod means are rigidly connected with stability relative to each other.